United States Patent [19]
Creeger et al.

[11] Patent Number: 5,974,726
[45] Date of Patent: Nov. 2, 1999

[54] METHOD OF CONTROLLING PESTS AND ASSOCIATED APPARATUS

[76] Inventors: Samuel M. Creeger, 6306 Bartlett St.; Uri Fakiro, 1736 Wightman St., both of Pittsburgh, Pa. 15217

[21] Appl. No.: 09/092,214

[22] Filed: Jun. 5, 1998

[51] Int. Cl.$^6$ .............................. A01M 1/20; A01M 1/00
[52] U.S. Cl. .............................. 43/107; 43/131; 43/132.1
[58] Field of Search .............................. 43/107, 110, 111, 43/124, 131, 132.1; 449/1, 2; 89/1.11; 102/419, 426, 427; 206/484; 220/359.1

[56] References Cited

U.S. PATENT DOCUMENTS

| | | | |
|---|---|---|---|
| 3,857,934 | 12/1974 | Bernstein et al. | 43/131 |
| 3,864,468 | 2/1975 | Hyman et al. | 43/124 |
| 4,160,335 | 7/1979 | Von Kohorn et al. | 43/131 |
| 4,374,201 | 2/1983 | Orlando et al. | 89/1.11 |
| 4,380,582 | 4/1983 | Orlando et al. | 89/1.11 |
| 4,639,393 | 1/1987 | Von Kohorn et al. | 43/111 |
| 4,666,767 | 5/1987 | Von Kohorn et al. | 43/111 |
| 4,793,474 | 12/1988 | Drake | 43/124 |
| 4,874,611 | 10/1989 | Wilson et al. | |
| 5,057,315 | 10/1991 | Gunner et al. | 43/132.1 |
| 5,057,316 | 10/1991 | Gunner et al. | 43/132.1 |
| 5,182,879 | 2/1993 | Hopkins | 43/131 |
| 5,189,831 | 3/1993 | Miller et al. | 43/132.1 |
| 5,303,496 | 4/1994 | Kowalkowski | 43/1 |
| 5,310,552 | 5/1994 | Gunner et al. | 43/131 |
| 5,311,697 | 5/1994 | Cavanaugh et al. | 43/132.1 |
| 5,427,784 | 6/1995 | Gunner et al. | 43/131 |
| 5,452,540 | 9/1995 | Dowd et al. | 43/107 |
| 5,527,531 | 6/1996 | Linhart . | |
| 5,679,362 | 10/1997 | Miller et al. | 43/132.1 |
| 5,763,815 | 6/1998 | Thomas et al. | 89/1.11 |

OTHER PUBLICATIONS

Wilkins, Stacey, (Jul. 13, 1999), Japanese invent world's tiniest robot, CNN interactive, [online], Available web site: wysiwyg://12/http://cnn.com/TECH/ptech/9907/13/japan-microrobot/, Accessed on: Jul. 15, 1999.

Micromachine Center, (May 27, 1999), [online], Available web site: www.iijnet.or.jp/MMC/, Accessed on: Jul. 15, 1999.

Carson, Mary Kay, (Oct. 5, 1998), Micromachines, Science World, [online], v55(n3), Available web site: drlink.mnis-.net/current/index.cgi, Accessed on: Jul. 9, 1999.

Georgia Institute Of Technology, The Common Man's Micromachine? Researchers Cut the Cost of Tiny Gears and Motors by Using Standard Equipment, Jun. 26, 1991, (2 pp.), Georgia Institute of Technology Research Communications Office, Atlanta, Georgia.

FMC Corporation, FMC Ant Identification Chart, (1995), (2–sided document) Princeton, New Jersey.

*Primary Examiner*—Thomas Price
*Assistant Examiner*—Darren W. Ark
*Attorney, Agent, or Firm*—Arnold B. Silverman; Eckert Seamans Cherin & Mellott, LLC

[57] ABSTRACT

A method and apparatus for controlling ants and other pests are provided. A micromachine has a battery and a remotely actuatable electrical switch operatively associated therewith. The micromachine has at least a portion thereof covered by an ant attractant such as food or bait, for example. The micromachine is of such size and weight as to be readily transportable by a fire ant or carpenter ant or other pest. In one embodiment, a resistance heating element is energized by the battery when the switch is closed thereby causing communication between a recess containing a pheromone or fungus or other ant controllant substance and the exterior of the micromachine. A thermally deformable bimetallic element may be employed for this purpose. Alternatively, a plastic film, which will degrade under the influence of heat, may be employed. In an alternate embodiment, a radio frequency transmitter will emit a signal to assist with location of the ant or pest nests and thereby permit action to be taken to control the ants.

33 Claims, 3 Drawing Sheets

METHOD OF CONTROLLING PESTS AND ASSOCIATED APPARATUS

BACKGROUND OF THE INVENTION

1. Field of the Invention

The present invention relates to a method and apparatus for the control of pests, such as ants and bees and, more particularly, it relates to the use of micromachines at least partially covered by an attractant and having radio activated switch means which establish responsive battery activation of means which directly or indirectly initiate action to control the pests.

2. Description of the Prior Art

In addition to other pests, such as wasps and bees, there are approximately 10,000 species of ants worldwide. Depending on the species, they nest in the ground, in trees or in man-made structures. Ants feed upon everything humans do in addition to a variety of other items.

Ants can be beneficial in that they attack and kill pests of humans and agricultural crops, play a role in soil aeration, nutrient cycling and topsoil formation, pollinate certain plants, and are a source of human food in certain societies.

However, some ants are harmful to humans. Ants have been found to carry human disease organisms which they spread when they invade hospitals and walk on patients, patients' food and medical preparations. Ants also attack and destroy agriculturally important crops and animals, and reduce populations of native birds and reptiles. Certain ants also tunnel through trees and wooden structural members in homes causing serious structural damage.

All ants are social insects in that they live in colonies containing specialized groups of ants. These groups are the workers, the larvae, the queen, and the males. The queen controls the activities in the nest by emitting chemical signals to the members of the colony.

The workers are sterile females and are the most numerous members of the colony. They perform most of the work of the colony such as constructing the nest, gathering food, feeding other members of the nest, defending the nest, and cleaning the nest. The larvae are grub-like, immature ants that are constantly fed, groomed and protected by the worker ants until they develop into adult ants.

Due to their extremely narrow esophagus, the adult ants (the workers, queens, and males) are generally able to consume only liquid foods. The workers regurgitate some of the liquid food in their stomach to other members of the colony, including the queen. Sharing nourishment in this manner is called trophallaxis.

The larvae (in their later stages of development) are the only members of the colony that can consume solid food. The larvae are fed pieces of solid food which they digest. The larvae then exude certain secretions through their skin which are eagerly licked up by the workers. When the larvae have grown, they go through a period of change called metamorphosis, during which they change from their grub-like form to an adult ant.

After an ant colony has matured, some of the larvae metamorphose into winged, fertile females and males, in addition to workers (sterile females). At the appropriate time, these fertile females and males mate (either in the nest or outside the nest) and the fertilized female, now called a queen, seeks a suitable location to establish a new colony. The male dies shortly after mating. The queen will lay about a dozen eggs which she tends to and feeds until they have developed into adult ants. During this period, the queen does not leave the nest or gather food, but she lives on the nourishment from the stored fat and dissolving wing muscles in her body. She also feeds the first brood of developing larvae by regurgitating some liquid food to them. When the first adult ants hatch, they leave the nest to gather food for themselves and the queen. From this point on, the queen's only function is to increase the population of the nest by laying eggs. The nest grows in size and matures and the cycle is repeated when fertile females and males are produced.

The ability of ants to thrive under a variety of conditions and man's expansion into areas naturally inhabited by ants has brought ant and man into confrontation. Man has employed various means to control ants including pesticidal sprays, dusts, baits, pouring boiling water into an ant mound, and removing food sources. Most recently, use of pheromones to detrimentally alter the behavior of the ants, use of disease organisms to kill the members of the ant colony, and use of natural insect enemies of ants are being researched and used to control ants. The Florida Department of Agriculture released several thousand Brazilian phorid flies in an attempt to control the fire ant in Florida. However, even with the above control attempts over the years, ants continue to thrive and cause damage. A primary reason for this is that the ant colony, and in particular, the queen and developing larvae, being below ground, in a tree limb, or inside the wall of a home, are hidden from view and protected. In most cases, unless the queen and developing larvae are destroyed, the ant colony can regenerate to its pretreatment population levels in a short period of time. Therefore, the key to greater control of ants is being able to deliver an ant-controlling substance deep into the nest where the queen and developing larvae reside or being able to locate the queen and developing larvae so they can be treated and eliminated by conventional means, such as spraying with an insecticide.

The fire ant is believed to have been introduced into the port of Mobile, Ala. in the 1930's, most likely in soil used as ballast on South America cargo ships. The fire ants spread from Mobile to other areas across the southern United States. Spread of the fire ants is due not only to natural mating flights, but also to the movement of infested plants, sod, and soil. In 1958, the Federal Fire Ant Quarantine was enacted to try to prevent the spread of fire ants from quarantined areas, but the ant continues to spread at the rate of 5–12 miles per year. Eventually fire ants, unless controlled, are expected to infest almost one-fourth of the United States, including the western seaboard where temperature and moisture are adequate to support establishment of the fire ants. Northward spread of fire ants has been limited by cold weather, but colonies can survive in northern areas by building their nests under roadways, against concrete slabs and in external walls of heated buildings.

The mound or nest of the fire ants has no external openings; underground tunnels radiating from the mound allow ants to come and go in search of food. The number of ants determines the size and growth of each colony. Beginning colonies are generally a few inches across, compared to older colonies which may be in excess of two feet or more in height and diameter. The mound is a series of interlocking tunnels and chambers which may reach more than five feet below the surface. Where the ants are located within the nest is dependent on weather conditions, water level and other factors.

Fire ants are best known for their aggressive behavior. If their nest is disturbed, they defend it by swarming out and over the mound, even running up grass blades and sticks.

Workers of many different sizes make up the fire ants colony. The largest workers are called majors; the mediumsized workers are called medias; and the smallest workers are minors. However, the age of the worker ant, not her size, determines what tasks she will eventually perform.

A mature fire ant colony may contain 100,000 to 500,000 workers and several hundred winged males and females that remain in the nest until weather conditions are favorable for mating flights. After mating in the air, the new queen falls to the ground to begin a new colony, and the male falls to the ground and dies.

Eggs of the fire ant hatch in 7–10 days into grub-like larvae. Larvae are totally dependent on workers for their care. During the following 6–12 days, the larvae will molt four times. After the fourth molt, larvae become pupae and go through metamorphosis. Adults emerge in 9–16 days and begin their tasks in the colony. The oldest ants in the colony are the "foragers." They are responsible for locating food to feed the colony. When a food source is found, the foragers lay a chemical trail back to the mound where they recruit other ants to help transport the food back to the colony.

Fire ant colonies need large amounts of carbohydrates, proteins and fats for their development. They get most of their carbohydrates from eating plant sap and most of their proteins and fats from eating dead animals or those they kill. Fire ants are especially fond of insects. Fire ants may chew and extract liquids from the food source immediately or they may bring the food particle back to the mound where it is given to the largest larvae, the only stage of the fire ant life cycle that can digest solid food.

The fire ant queen controls colony growth and activity by the secretion of chemicals that are licked off of her and passed from worker to worker. Certain workers shield the queen from danger by consuming foods before they are fed to her and by quickly carrying her away if the mound is disturbed. The colony can endure as long as the queen and a few workers survive. This guarding of the queen makes eliminating a fire ant colony very difficult.

Fire ant colonies may include one or more queens. Single queen colonies are very territorial toward other fire ants. Newly mated queens landing in the territory of a single queen colony are attacked and killed. Colony life is different in multiple queen fire ant colonies. Workers in these colonies are less aggressive toward workers from other mounds, therefore, mounds are closer together, making those areas more heavily infested. In multiple queen sites, newly mated queens are often accepted into the colony instead of being killed. Multiple queen colonies may contain a few queens or up to several hundred. Control of these colonies is challenging, because as long as one queen survives, the colony can continue.

The aggressive behavior of fire ants and the ability of each worker to sting repeatedly threatens both man and animal. The sting injects a venom that causes an extreme burning sensation. Pustules, which can become infected if scratched, form. Allergic reactions of people sensitive to the venom include dizziness, swelling, shock and in extreme cases, unconsciousness and death. People exhibiting such symptoms should see a physician. Each year, fire ants do an estimated $300 million in damage in Texas alone. This figure includes pesticide purchases, medical expenses, equipment repair, and livestock losses in rural areas. Fire ants also cause loss of use of public parks and playgrounds, damage to roadway structures, and an indeterminable amount of damage to the environment and local ecosystems. Due to fire ants, Texas has lost a large amount of ground-nesting birds such as quail, doves, and pheasants.

A population of native ants is one of the few factors that can slow the invasion of fire ants. Newly mated fire ant queens, before burrowing into the ground, are susceptible to being killed by native ants. Therefore, it is important to consider the preservation of native ant species when applying fire ant control measures.

Eradication of imported fire ants is difficult using present day pesticides because of 1) the large area of infestation, 2) the relatively small area that can be treated with pesticides, 3) short residual activity of current pesticides, and 4) the rapid recolonizing rate of treated areas. Introducing pheromones or disease organisms into the fire ant nest would be an efficient way to control the fire ants, but until the present invention there was no effective way to get the pheromones or disease organisms deep into the nest where the queen and developing larvae reside.

Winged male and female black carpenter ants, called swarmers, emerge from mature colonies usually from March to July. After mating, males die and newly fertilized females (mated for life), now called queens, establish a new colony in a small cavity in moist wood such as a tree stump, fire wood stored near a home, or a wooden porch moistened by rain. The queen lays 15 to 20 eggs in 15 days and feeds the larvae that hatch from the eggs with a regurgitated fluid. The queen does not take food, but uses her stored fat reserves and her wing muscles for her nourishment. The carpenter ants egg stage takes about 24 days, the larval stage 21 days, and the pupal stage 21 days for a total of about 66 days from egg to adult at a temperature of 70 to 90 degrees F. Cool weather may lengthen this period up to 10 months. The few workers emerging from the first brood assume duties of the colony, collecting food, excavating galleries to enlarge the nest and tending the eggs, larvae and pupae of the second generation. Workers regurgitate food for nourishment of the developing larvae and the queen. The queen's duties now are laying eggs and controlling activities in the nest by secreting chemicals that are sensed by the colony members.

It takes about three years for a carpenter ant colony to mature and produce swarmers. A mature colony, after three to six years, may have about 2,000 to 4,000 individuals. Workers have strong jaws and readily bite when contacted.

Carpenter ant nests are usually established in soft, moist (not wet), decayed wood or occasionally in an existing wood cavity or void area in a structure that is perfectly dry. Workers cut galleries in the wood, expanding the nest size for the enlarging colony. Galleries are irregular, usually excavated with the wood grain (sometimes across the grain) into softer portions of the wood. The walls of the nest are smooth and clean (sandpapered appearance) with shredded sawdust-like wood fragments, like chewed up toothpicks (frass), carried from the nest and deposited outside. These piles of wood fragments, often found beneath special openings (windows) or nest openings, may contain indigestible food items such as portions of insects and empty seed coats.

Carpenter ants do not eat wood, but excavate wood galleries in which to rear their young ants. The food diet is of great variety (omnivorous) consisting of both plant and animal materials such as plant juices, fresh fruits, insects (living or dead), meats, syrup, honey, jelly, sugar, grease, fat and "honey dew" (aphid excrement), for example. They feed readily on termites and usually never coexist with them in a home. Workers are known to forage for food as far as 100 yards from their nest.

Carpenter ants may establish nests in a number of different locations. It is important to realize that these locations can be either inside the walls of a home or outside the home in a tree stump. Carpenter ants actually construct two different kinds of nests: parent colonies which, when mature, contain an egg-laying queen, brood and 2,000 or more worker ants, and satellite colonies which may have large numbers of worker ants, but no queen, eggs or young larvae. The carpenter ants found inside a person's home may have originated from the parent colony or from one or more satellite nests.

Control of carpenter ants necessitates locating the site of the nest and treating it with pesticide or otherwise destroying it. Locating the exact position of the nest is often difficult because the point of entry of a single carpenter ant may be 10 feet or more from the nest. If carpenter ants are seen entering a hole in the wall of a home, they may travel many feet behind the wall before reaching the nest. Therefore, treatment of the entry hole or the immediate vicinity around the entry hole may not reach the nest where the queen resides. The difficulty in controlling carpenter ants is reflected in a survey of pest control operators (PCO) that provide carpenter ant service. The survey revealed that 50% of the carpenter ant jobs performed required return visits and additional treatment.

Another method of controlling carpenter ants involves the use of baits. A favorite food material of carpenter ants, such as certain insect larvae and pupae, are ground and mixed with a slow-acting toxicant and then formulated into small granules that the carpenter ant can pick up. A PCO spreads the small bait granules around the vicinity of the carpenter ants nest where carpenter ants have been seen foraging. The carpenter ants pick up and bring the granules into the nest where the granules containing the toxicant are fed to the larvae. The worker ants may also crush the granules and swallow any liquid that may ooze from the granules. The slow-acting toxicant is then spread through the colony by trophallaxis and the colony may eventually be eliminated. However, the use of baits requires weeks to months to take effect and may require repeat applications. Also, the effectiveness of baits is reduced when there are competing food sources for the carpenter ants.

U.S. Pat. No. 4,874,611 discloses the use of a microencapsulated ant bait wherein a core is said to contain an attractant such as soybean extract mixed with an insecticide. An outer shell is formed over the core. The shell is said to have adequate strength and water resistance while permitting penetration by insects.

U.S. Pat. No. 5,527,531 discloses a system for delivery of biologics or chemicals to wild animals such as raccoons, dogs or foxes. A waterproof capsule which contains the material desired to be delivered is embedded in synthetic bait which serves as an attractant. A sleeve made of sponge material, for example, may be employed over the capsule and provided with the food attractant.

In spite of the foregoing prior art disclosures, there remains a very real and substantial need for a method and apparatus of effectively controlling ants and other pests, such as wasps and bees, so as to destroy them or interfere with their ability to procreate.

SUMMARY OF THE INVENTION

The present invention has met the above-described need by providing a method and associated apparatus for effectively controlling ants and other pests. The method takes advantage of miniaturized or microelectromechanical miniature machines which can be remotely activated.

In a preferred method of the present invention, a micromachine has a remotely actuatable switch and an operatively associated battery. The micromachine is covered, at least in part, with an ant attractant which may be food or bait or combinations of attractants. After a pest, such as an ant, has transported the micromachine, and preferably has transported the same into the nest, a conventional transmitter may be employed to close the switch and thereby establish responsive action to control the pests.

In one embodiment of the invention, a supply of pheromone or fungus or other substance which would control the pests, is provided within a recess in the micromachine and, closing the switch causes an opening to be created so that the substance may be released.

In another embodiment, a radio frequency transmission is emitted by the micromachine so as to provide means for determining the location of the ant or wasp or bees nest which can then be destroyed by professionally trained pest control personnel.

It is an object of the present invention to provide a method and apparatus for employing single use microelectromechanical machines in facilitating control of undesired pests, such as ants.

It is another object of the present invention to provide such a system wherein an electrical switch may be remotely closed so as to cause a battery, contained within the microelectromechanical machine, to energize other portions thereof to initiate control of the ants.

It is a further object of the present invention to provide in one embodiment a system wherein a material which is either an insecticide or a pheromone which will interfere with procreation of the ants is released responsive to the generation of heat through an electrically energized resistor which is part of the micromachine.

It is another object of the present invention to provide an embodiment wherein the closing of the switch within the micromachine initiates transmission of radio frequency signals from the micromachine so as to permit personnel to locate the ant nest and eliminate the same.

These and other objects of the present invention will be fully understood from the foregoing description of the invention on reference to the illustrations appended hereto.

DESCRIPTION OF THE PREFERRED EMBODIMENTS

The term "micromachine," as employed herein, refers to miniaturized machines which are typically made of metal or a polymeric material and are known to those skilled in the art and may have electrical components as well. See generally, "The Common Man's Micromachine? Researchers Cut The Cost of Tiny Gears and Motors by Using Standard Equipment," Georgia Institute of Technology (1991). The term, as used in the present context, will be used interchangeably with the expression "microelectromechanical miniaturized machines" or "microelectromechanical machines." In general, these machines will have a maximum dimension of about 10 to 1,000 micrometers, but may vary slightly depending on the particular need.

The term "attractant," as employed herein, refers to any substance which a pest will find appealing as a food item such that it will tend to transport it back to the nest and expressly includes foods, baits, attractants and feeding stimulants, as well as combinations thereof. The attractant should not be positioned in such a thickness or be composed of such a material or placed in such position as to interfere with radio frequency communication contemplated by the present invention. An "ant attractant" is an attractant appealing to ants.

While, for purposes of simplicity of discussion, two primary ants, the fire ant and the carpenter ant, will be expressly discussed herein, it will be understood, however, that the invention is not specifically limited to use in controlling these two species of ants, but may be employed to control a wide variety of undesirable ants such as odorous house ants, pharaoh ants, wasps, killer bees and other nesting insects, for example. As employed herein, the term "pests" shall include, but not be limited to, ants, wasps, bees, and other nesting insects.

A common strand of the present invention is the concept of the micromachines of the present invention being of such size and shape that an ant or other pest may readily transport the same into its nest and thereby facilitate control over and destruction of the ants or pests. This is accomplished through radio frequency communication between the micromachine and the user of the system.

Figure 1:
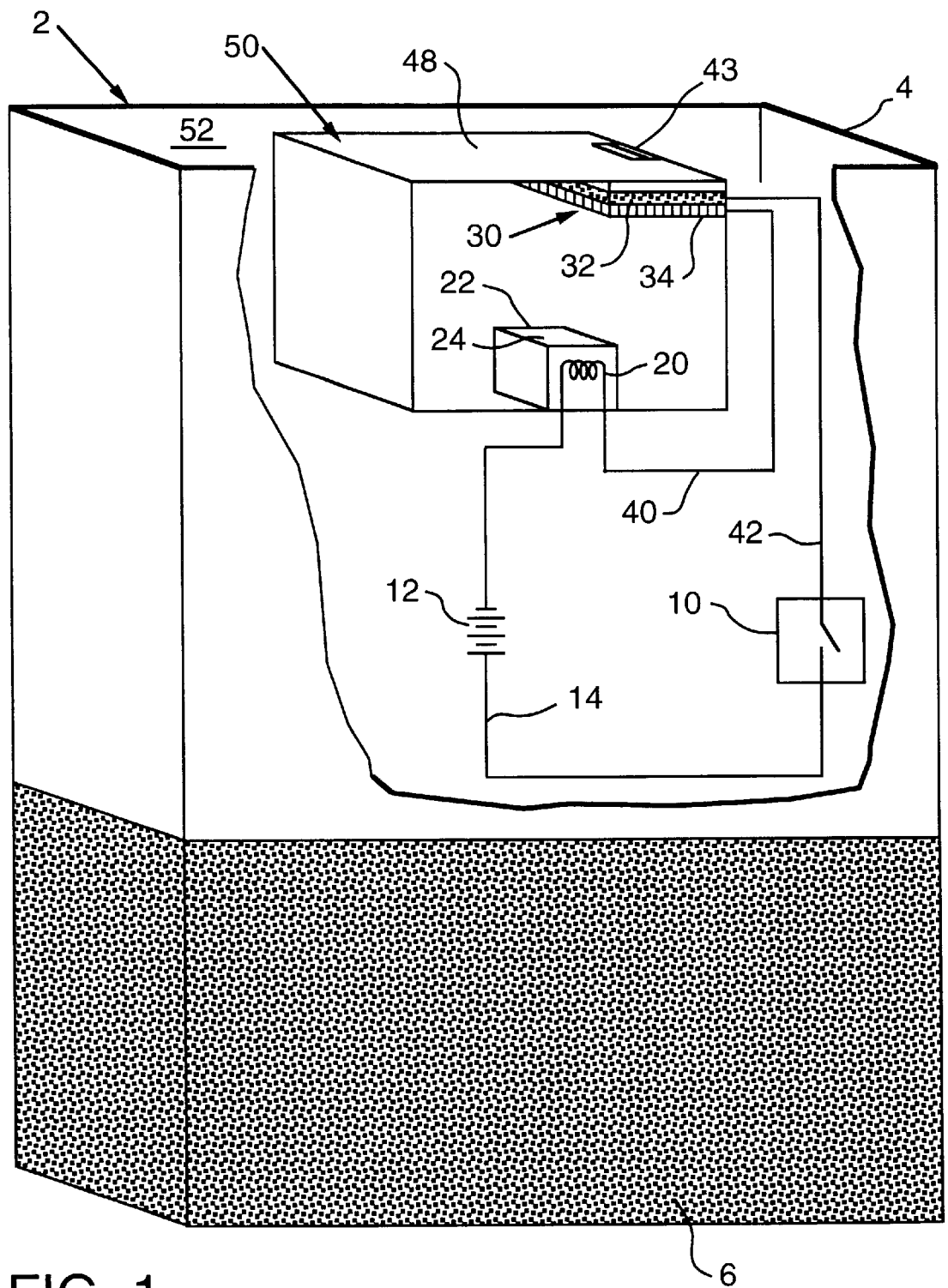
FIG. 1 is a schematic illustration of a form of electromechanical micromachine employed in the methods of the present invention.

Referring to FIG. 1, there is shown a micromachine 2 which has a protective housing 4 and an ant attractant 6 which is shown covering only a portion of the exterior surface of the micromachine 2, but preferably would cover at least a major portion thereof in a thickness of about 0.1 to 1.0 millimeter. In the embodiment illustrated in FIGS. 1 and 2, a radio frequency actuated relay switch 10, which is normally in the switch open position, is electrically connected to battery 12 which may be a thin film battery which is readily known to those skilled in the art. Battery 12 is connected to switch 10 by electrically conductive lead 14. An electrical heating element 20 is secured within a chamber 22 which contains a suitable fluid 24 such as n-pentane or n-hexane, for example. A bimetallic element 30 consists of a portion 32 composed of a first metal and a portion 34 composed of a second metal intimately bonded thereto. Conductive lead 40 connects electrical heating element 20 with element 34 and electrical lead 42 connects element 32 with switch 10. When the switch 10 is closed through radio frequency actuation, battery 12 will energize resistance element 20 thereby causing the fluid in chamber 22 to expand as a result of thermal expansion to fracture the chamber 22 and thereby urge the pheromone, hormone, disease-causing microorganism, parasite, insecticide or fungus or other material out of container 50. The electrical leads 40, 42 have imposed currents on bimetallic element 30 thereby causing differential expansion of elements 32, 34 which are composed of different materials and causing the lid 48 to open by rotating about hinge 43, thereby permitting the contents to be discharged. It will be appreciated that in the preferred embodiment the lid 48 will open prior to fracture of container 22.

Figure 2:
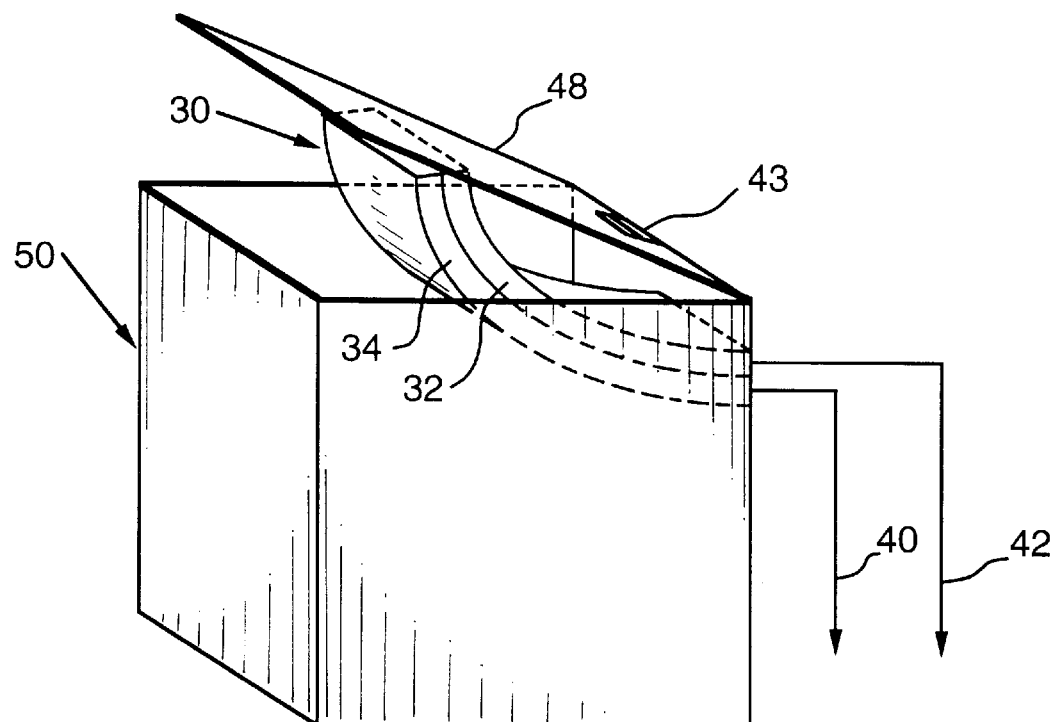
FIG. 2 is a fragmentary illustration showing a modified position of a portion of the structure of FIG. 1.

As shown in greater detail in FIG. 2, the bimetallic beam 30, when subjected to the appropriate level of heating, will go from its generally planar configuration shown in FIG. 1 to the curved configuration shown in FIG. 2 thereby causing the lid 48 of the container 50 to rotate upwardly about hinge member 43. The upper portion 52 (FIG. 1) of the micromachine 2 is open to permit discharge of the pheromone, hormone, disease-causing organism, parasite, insecticide or fungus. The contents of the small container 50 are released through the open end 52 of housing 4 and enter the nest interior. If the material is a pheromone, the queen will have lost full control over the normal activities of the nest thereby producing a breakdown in the social structure of the nest and creating an inability of the colony members to function normally.

The container 50 will, depending upon the manner in which the ants are to be controlled, contain a pheromone which is designed to interfere with normal sexual activity in propagating the species and thereby bring about eventual extinguishment of the species in the nest, or may be a disease-causing element, such as a fungus or other microorganism. Examples of other materials which could be used are an alarm pheromone that causes the ants to act as if the nest is being attacked resulting in the ants attacking one another, or an insecticide, or a parasitic organism.

Figure 3:
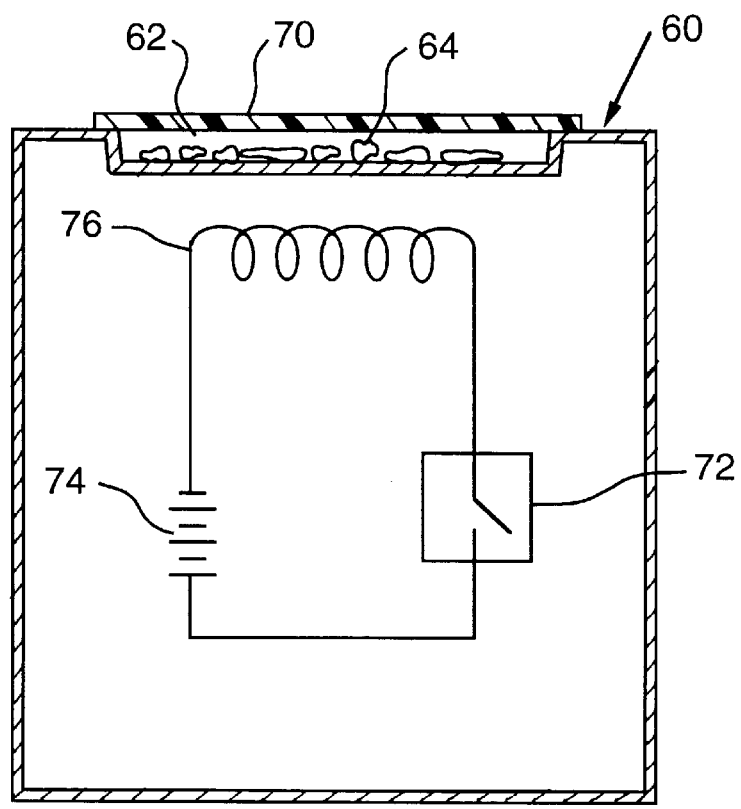
FIG. 3 is a fragmentary illustration of an alternate embodiment of a portion of a system employable in the control of pests in accordance with the present invention.

Referring to FIG. 3, an alternate embodiment of the invention will be considered wherein the micromachine 60 has an outwardly open recess 62 within which a material, such as a pheromone or fungus, for example 64, is provided. A thermally destroyable film 70, such as a resinous plastic film, is provided in sealed overlying relationship with respect to recess 62. The switch 72, when closed, causes the battery 74 to energize electrical resistance coil 76 thereby creating sufficient heat to destroy the integrity of film 70 and permit the material 64 to be released within the nest.

It will be appreciated that any suitable RF generator having an output at the appropriate frequency can be employed to close or open the radio frequency activated relay switch 10, 72. After completion of release of the material, the charge from the particular micromachine will have been used and there being no means for reclosing the embodiment of FIG. 3. As the micromachines are intended for a singe use, there is no need to effect opening of the switch.

The embodiment of FIGS. 1 and 3 is particularly advantageous in respect of controlling fire ants.

Figure 4:
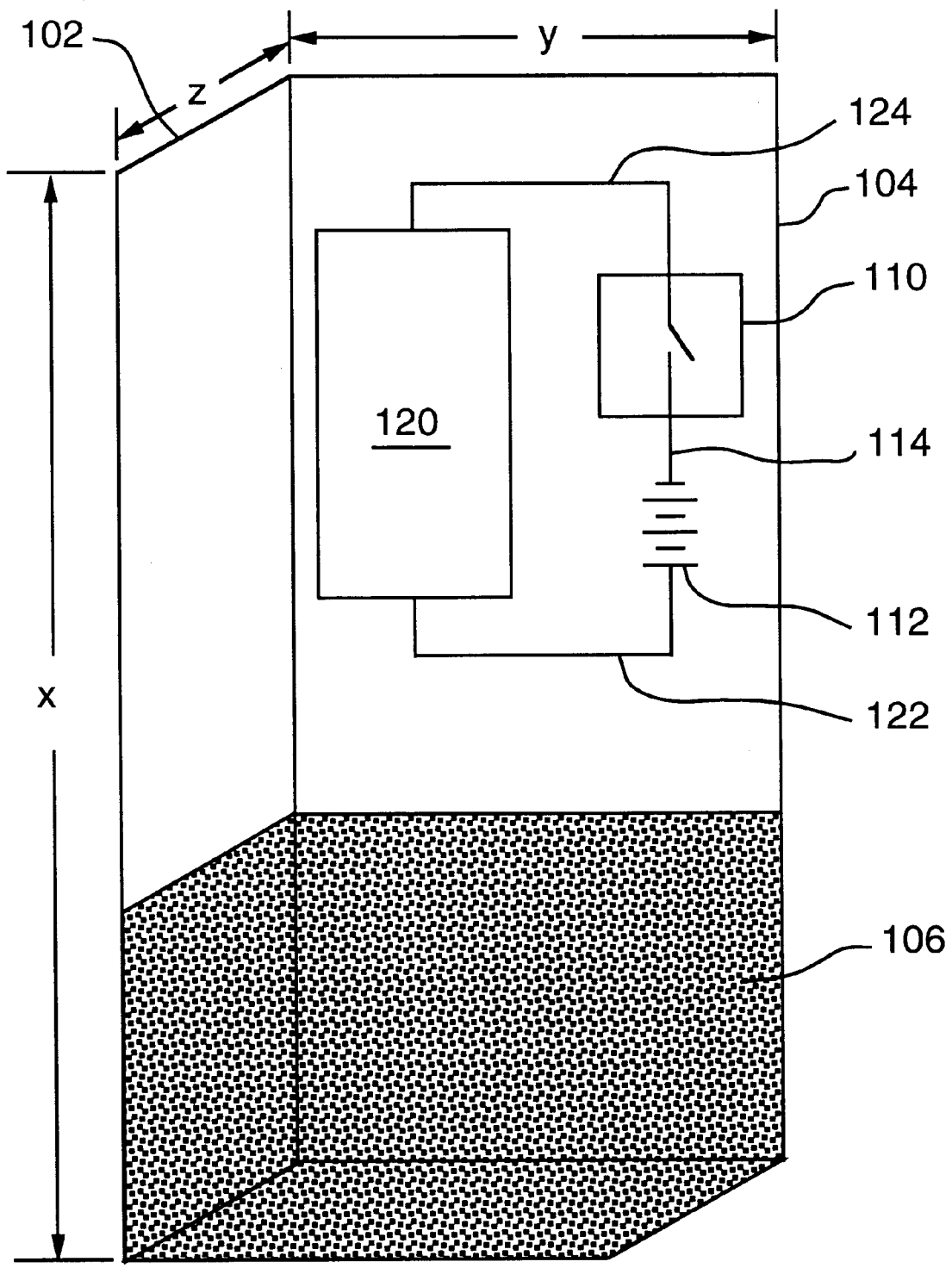
FIG. 4 illustrates a microelectromechanical machine of the present invention operable to control ants in a different manner from the embodiments of FIGS. 1 through 3.

In the embodiment shown in FIG. 4, a micromachine 102 has an ant attractant 106 coated on the housing 104 preferably over at least a major portion thereof. The micromachine in this view is shown as having a height X of about 2 to 4 mm and a width Y of about 1 to 2 mm with a depth Z of about 1 to 2 mm. The measurements are taken of the housing exclusive of the coating of ant attractant material 106. In this embodiment, the radio frequency activated switch 110 is operatively associated with a battery 112 by electrical lead 114. A radio frequency transmitter 120 is adapted to emit radio frequency signals when the switch 110 is in a closed position. The transmitter is electrically connected to the battery 112 through lead 122 and to the switch 110 through lead 124. After the ant has transported the attractant covered micromachine to the nest, employing a conventional radio frequency transmitter, at the desired frequency, will effect closing of the switch thereby causing radio frequency waves to be transmitted. Any suitable radio frequency detector may be employed to locate the nest which contains the micromachine 102.

The radio frequency emitted by the embodiment of FIG. 4 can be found using a field strength meter, a radio frequency sniffer or other electronic direction finder/triangulation techniques. This facilitates uncovering and elimination of the nest.

The embodiment of FIG. 4 is particularly well-suited to use with control over carpenter ants. The outer portion or housings may be made of a polymeric material which does not interfere with desired signal transmission.

As ants are able to drag or carry weights approximately 10 to 50 times their weight, the micromachines of the present invention may be made sufficiently small and light as to permit transport to the nests.

In using the method of the present invention, the micromachines will be placed in the foraging area of the fire ant nests and after the one or more micromachines have been brought to the nest, the radio frequency signal will be transmitted from outside thereby causing the switch to close and thereby releasing the pheromone, hormone, disease-causing microorganism, fungus or fungal spores.

While reference has been made herein to certain components being disposed in the micromachine and this will generally be the preferred approach unless in a specific instance the location is specifically limited to such a location, the term shall be deemed to embrace items secured to the exterior thereof.

While for simplicity of disclosure herein, specific reference has been made to ants, it will be appreciated that the invention may also be employed in the control of other types of pests such as wasps and killer bees, for example.

It will be appreciated from the foregoing that the present invention takes advantage of modern micromachine technology to induce ants and other pests to carry suitably equipped micromachines back into the nest after which externally applied radio frequency signals are employed to close an electrical switch and produce action which effects control over the ants or pests.

Whereas particular embodiments of the invention have been described above for purposes of illustration, it will be evident to those skilled in the art that numerous variations of the details may be made without departing from the invention as defined in the claims.

What is claimed is:

1. An apparatus for controlling pests comprising
 a micromachine having a pest attractant secured to at least a portion of an exterior thereof,
 said micromachine having a battery and an electrical switch operatively to be associated therewith, and
 means responsive to said switch assuming a closed position for establishing current from said battery to initiate responsive action.

2. The apparatus for controlling pests of claim 1 including said apparatus being of such size and weight as to be readily transportable by pests.

3. The apparatus for controlling pests of claim 1 including
 said pests being ants,
 said attractant being an ant attractant, and
 said attractant being at least one material selected from the group consisting of food and bait.

4. The apparatus for controlling pests of claim 3 including
 radio frequency transmission means disposed within said micromachine for emitting a radio frequency signal when said switch is in the closed position.

5. The apparatus for controlling pests of claim 1 including said micromachine containing a supply of pheromone.

6. The apparatus for controlling ants of claim 1 including said micromachine containing a supply of fungus.

7. The apparatus for controlling pests of claim 1 including
 said micromachine having a resistance heater which is operatively associated with said battery so as to provide an elevated temperature when said switch is in the closed position, and
 said micromachine having a container within which is stored a material which will assist with control of ants.

8. The apparatus for controlling pests of claim 7 including
 said container being operatively associated with a bimetallic element which, responsive to application of said current from said battery causing an increase in temperature, will establish communication between the container and the exterior of said micromachine.

9. The apparatus for controlling pests of claim 8 including
 said container having a movable cover which will be moved upon said increase in temperature of the bimetallic element causing deformation thereof.

10. The apparatus for controlling pests of claim 7 including
 said micromachine having a maximum dimension of about 1 to 4 mm.

11. The apparatus for controlling pests of claim 7 including
 said material is selected from the group consisting of pheromones, hormones, disease-causing microorganisms, parasites, fungus or fungal spores and insecticides.

12. The apparatus for controlling pests of claim 7 including
 said micromachine having a recess within which is stored a material which will assist with control of ants, and
 said recess being covered with a film which will lose its integrity upon elevation to a predetermined temperature thereby causing discharge of the material contained within said recess.

13. A method for controlling pests comprising
 providing a micromachine having a remotely actuatable switch, a battery and at least a portion of an exterior of said micromachine covered with a pest attractant,
 remotely closing said switch, and
 effecting by said switch closing energizing a battery to initiate action to control said pests.

14. The method for controlling pests of claim 13 wherein the step of remotely closing said switch including
 closing said switch after said micromachine has been transported by a pest.

15. The method for controlling pests of claim 14 including
 employing said method in controlling said pests which are ants,
 employing an ant attractant as said attractant,
 effecting said switch closing after an ant has transported said micromachine into an ant nest.

16. The method for controlling pests of claim 15 including
 said ant attractant containing at least one attractant selected from the group consisting of food and bait.

17. The method for controlling pests of claim 15 including
 said action to control said ants including release of a pheromone.

18. The method for controlling pests of claim 15 including
 said action to control said ants including release of a fungus.

19. The method for controlling pests of claim 15 including
 providing an RF frequency transmitter within said micromachine, and
 employing as said action to control said ants transmission of an RF signal by said transmitter, and receipt of said signal exteriorly of said micromachine as an indication of the location of said ant nest.

20. The method for controlling pests of claim 15 including
subsequently destroying said ant nest by employing a material selected from the group consisting of pheromones, hormones, disease-causing microorganisms, parasites, fungus or fungal spores and insecticides.

21. The method for controlling pests of claim 14 including
employing said battery to heat a portion of said micromachine to release a substance which will control said ants.

22. The method for controlling pests of claim 21 including
employing pheromones as said substance.

23. The method for controlling pests of claim 21 including
employing fungus as said substance.

24. The method for controlling pests of claim 21 wherein the step of employing said battery to heat including
employing said battery when said switch is closed to cause generation of resistance heat.

25. The method for controlling pests of claim 24 including
said micromachine having a bimetallic element which is thermally activated by said resistance heat to open a container containing said substance.

26. The method for controlling pests of claim 25 including
employing a change in temperature of said bimetallic element to open a portion of said container containing said substance to thereby release said substance.

27. The method for controlling pests of claim 25 including
said container being closed by a hinged wall which is moved to an open position upon elevation of the temperature of said bimetallic element.

28. The method for controlling pests of claim 21 including
providing said substance in a recess within said micromachine in communication with the exterior thereof and securing said substance within said recess by a film, and employing said heat to destroy the integrity of said film and thereby permit release of said substance.

29. The method for controlling pests of claim 21 including
employing said method to control said posts which are fire ants.

30. The method for controlling pests of claim 21 including
employing said method to control carpenter ants.

31. The method for controlling pests of claim 14 including
said micromachine having a maximum dimension of about 1 to 2 mm.

32. The method for controlling pests of claim 13 including
covering at least a major portion of the exterior of said micromachine with said attractant.

33. The method for controlling pests claim 13 including
employing said method to control pests selected from the group consisting of wasps and bees.

* * * * *

UNITED STATES PATENT AND TRADEMARK OFFICE
CERTIFICATE OF CORRECTION

PATENT NO. : 5,974,726
DATED : November 2, 1999
INVENTOR(S) : Samuel M. Creeger et al.

Page 1 of 1

It is certified that error appears in the above-identified patent and that said Letters Patent is hereby corrected as shown below:

<u>Column 5,</u>
Line 27, first usage of "ants" should read -- ant --.

<u>Column 9,</u>
Line 62, "ants" should read -- pests --.

<u>Column 12,</u>
Line 13, "posts" should read -- pests --.

Signed and Sealed this

Twenty-ninth Day of January, 2002

*Attest:*

*Attesting Officer*

JAMES E. ROGAN
*Director of the United States Patent and Trademark Office*